United States Patent [19]

Dieterich et al.

[11] 4,144,267

[45] Mar. 13, 1979

[54] ORGANIC POLYISOCYANATES

[75] Inventors: Dieter Dieterich, Leverkusen; Peter Markusch, Cologne, both of Fed. Rep. of Germany

[73] Assignee: Bayer Aktiengesellschaft, Leverkusen, Fed. Rep. of Germany

[21] Appl. No.: 527,473

[22] Filed: Nov. 26, 1974

[30] Foreign Application Priority Data

Nov. 30, 1973 [DE] Fed. Rep. of Germany ....... 2359614

[51] Int. Cl.$^2$ .................... C07C 143/24; C08G 63/12; C08F 18/24

[52] U.S. Cl. ............................................... 260/505 R

[58] Field of Search .... 260/2.5 AT, 75 NT, 77.5 AT, 260/505 R, 182, 453 AR

[56] References Cited

FOREIGN PATENT DOCUMENTS 1278426   6/1972   United Kingdom.

*Primary Examiner*—A. Siegel

*Attorney, Agent, or Firm*—Gene Harsh; Joseph C. Gil

[57] ABSTRACT

Aromatic polyisocyanates containing sulphonic acid or sulphonate groups which are substantially free from crystalline product and a method for making them are provided wherein a mixture of aromatic polyisocyanates having an isocyanato content of from about 10% to about 42% by weight is sulphonated, the improvement which comprises mixing and reacting liquid aromatic polyisocyanates having a viscosity of from about 8 cP to about 49 cP at 25° C. and containing at least 40% by weight of phosgenation products of an aniline-phosgenation condensate and at least about 20% by weight of 2,6-tolylene diisocyanate, 2,4'-diphenylmethane diisocyanate, 2,2'-diphenylmethane diisocyanate or a mixture thereof, based on the weight of said liquid aromatic polyisocyanates with a sulphonating agent in an amount equivalent to from about 0.1% to about 40% by weight sulphur trioxide, based on the weight of said liquid aromatic polyisocyanates.

3 Claims, No Drawings

ORGANIC POLYISOCYANATES

This invention relates generally to organic polyisocyanates and more particularly to liquid aromatic polyisocyanates which are the phosgenation products of an aniline-formaldehyde condensate and to a method for making them.

As set forth in an earlier application belonging to the assignee of this application, Ser. No. 363,436, filed May 24, 1973 now abandoned, liquid aromatic polyisocyanates which contain sulphonic acid and/or sulphonate groups may be prepared by a process wherein a liquid multi-component mixture of aromatic polyisocyanates which has an isocyanate content of from 10 to 42 percent by weight and a viscosity of from 50 to 10,000 cP at 25° C. are mixed with from 0.1 to 10 percent by weight of sulphur trioxide or an equivalent quantity of oleum, sulphuric acid or chlorosulphuric acid at −20° to +200° C. and left to react and the sulphonation products which are obtained in this way may be completely or partly neutralized with a basic compound.

In accordance with the disclosure in the earlier application, the viscosity of the aromatic polyisocyanate mixture to be sulphonated is 50 cP because at least some solid crystalline product is obtained if the viscosity is lower than 50 cP.

It is an object of this invention to provide a process for making aromatic polyisocyanates containing a phosgenation product of an aniline-formaldehyde condensate having a viscosity below 50 cP. Another object of the invention is to provide phosgenation products containing aniline-formaldehyde condensates having a viscosity below 50 cP which are substantially non-crystalline. Still another object of the invention is to provide a process for sulphonating a mixture of aromatic polyisocyanates which is a condensation product of aniline and formaldehyde.

The foregoing objects and others are accomplished in accordance with this invention, generally speaking, by providing a process wherein a mixture containing at least about 40% by weight of liquid aromatic polyisocyanates prepared by condensing aniline and formaldehyde and having an isocyanato content of from about 10% to about 42% by weight and a viscosity of from about 8 cP to about 49 cP at 25° C. and containing at least about 20% by weight of 2,6-tolylene diisocyanate, 2,4'-diphenylmethane diisocyanate, 2,2'-diphenylmethane diisocyanate or a mixture thereof, based on the weight of the mixture of liquid aromatic polyisocyanates and the resulting mixture is sulphonated with a sulphonating agent in an amount which is equivalent to from about 0.1% to about 40% by weight sulphur trioxide, based on the weight of the mixture of aromatic polyisocyanates.

It has now surprisingly been found that liquid aromatic polyisocyanates which contain sulphonic acid and/or sulphonate groups can be obtained by sulphonating a liquid isocyanate multi-component mixture with a viscosity below 50 cP at 25° C. if the multi-component mixture used as a starting material contains at least 20 percent by weight of the aforesaid polyisocyanates with ortho isocyanate groups.

Furthermore, it has been found that these low-viscosity diisocyanates having a high ortho isocyanate content can be sulphonated to a much higher degree than has previously been possible when any significant quantity of crystalline sulphonation products being formed and without any undue rise in the viscosity during the sulphonation process. The quantity of 10% of sulphur trioxide, based on the starting isocyanate, which has previously been regarded as the upper-most limit, may now readily be exceeded. Sulphonation may now be carried out with approximately up to 40 percent by weight of sulphur trioxide. It is only when more than about 15% of sulphur trioxide is used that highly viscous resinous products which finally solidify at room temperature are obtained. Even when the degree of sulphonation is very high, practically no crystalline precipitates are formed.

This invention therefore provides a process for the production of liquid aromatic polyisocyanates which contain sulphonic acid and/or sulphonate groups in which liquid multi-component mixtures of aromatic polyisocyanates which have an isocyanate content of from 10 to 42 percent by weight are mixed with sulphur trioxide, oleum, sulphuric acid or chlorosulphonic acid at −20° to +200° C. and left to react and the sulphonation products obtained in this way may be completely or partly neutralized with a basic compound, characterized in that (a) the liquid multi-component mixture which is sulphonated is an aromatic polyisocyanate which has a viscosity of 8 to 49 cP at 25° C. and contains to an extent of at least 40 percent by weight phosgenation products of aniline and formaldehyde condensates and contains at least 20 percent by weight of 2,6-tolylene diisocyanate, 2,4'-diphenylmethane diisocyanate and/or 2,2'-diisocyanate diphenylmethane and (b) the sulphonating agent is used in a quantity which is equivalent to 0.1 to 40% by weight of sulphur trioxide, based on the quantity of polyisocyanate mixture which is to be sulphonated.

The present invention also provides polyisocyanates with sulphonic acid and/or sulphonate groups which can be obtained by this process.

Liquid multi-component systems of aromatic polyisocyanates which are suitable for use as starting substance for the process according to the invention are aromatic polyisocyanate mixtures which have an isocyanate content of 10 to 42 percent by weight and a viscosity at 25° C. of 8 cP to 49 cP and preferably 10 cP to 40 cP and which contain to an extent of at least 40 percent by weight phosgenation products of aniline formaldehyde condensates and which contain at least 20% and preferably 30% to 60% by weight of 2,6-tolylene-diisocyanate and/or at least 20%, preferably 30% to 90% by weight of 2,2'-diisocyanato-diphenylmethane and/or 2,4'-diisocyanato-diphenylmethane.

The isocyanates suitable for use as starting materials for the process according to the invention are, in particular, those phosgenation products of aniline formaldehyde condensates which contain at least 20% of 2,2'-diisocyanato-diphenylmethane or 2,4'-diisocyanato-diphenylmethane or mixtures of these two isocyanates. The amount of tetranuclear and higher nuclear isocyanates which they contain is generally less than 4%. Also suitable as starting materials are the so-called carbodiimidized diisocyanato-diphenylmethanes and mixtures of phosgenation products of aniline-formaldehyde condensates with tolylene diisocyanates in which the sum of 2,6-tolylene-diisocyanate, 2,2'-diisocyanato-diphenylmethane and 2,4'-diisocyanato-diphenylmethane should be at least 20% and preferably more than 30%. The so-called high 2,4'-diphenylmethane diisocyanate content first runnings obtained in the production of diphenylmethane diisocyanate (MDI) is most preferred.

The 2,4-tolylene-diisocyanate content should, however, not be more than about 50% based on the total mixture, and is preferably not more than about 10% to 40% by weight.

The pure commercial mixtures of tolylene diisocyanate isomers (viscosity 3.5 cP at 25° C.) alone are completely unsuitable for the process of the invention because of their high 2,4-isomer content which causes crystalline, insoluble uretdione monosulphonic and disulphonic acid to precipitate as crystals when attempts are made to carry out sulphonation. Liquid 4,4′-diisocyanato-diphenylmethane also results in solid, crystalline, insoluble products when attempts are made to carry out sulphonation. It must, therefore, be regarded as definitely surprising that as little as 20% of 2,6-tolylene diisocyanate, 2,2′-diisocyanato-diphenylmethane and/or 2,4′-diisocyanato-diphenylmethane is sufficient to prevent or at least significantly to reduce the precipitation of difficulty soluble crystalline products in the sulphonation of isocyanate mixtures.

A particularly preferred starting material contains a liquid multi-component mixture of aromatic polyisocyanates which contains a phosgenation product of aniline-formaldehyde condensates and which contains 30 to 100 percent by weight of dinuclear diisocyanates, of which at least 20 percent by weight are 2,2′- and/or 2,4′-isomers, and 0 to 20% of trinuclear triisocyanates and 0 to 4% of tetranuclear and higher nuclear polyisocyanates.

Mixtures of 40 to 90 percent by weight of a phosgenation product of aniline-formaldehyde condensates which contains 70 to 100% (preferably 81 to 95%) of dinuclear isocyanates and 10 to 60% of tolylene diisocyanate are also particularly suitable.

The term "polyisocyanates which contain sulphonic acid groups" is, of course, also used to include the equilibrium mixtures which are formed in known manner from the reaction of sulphonic acid groups with isocyanate groups and which contains, in particular, the adducts which contain mixed anhydride groups. The only essential requirement for the purpose of this invention is that the products should behave like isocyanate sulphonic acids, i.e. they should enter into typical isocyanate reactions (reaction with Zerewitinoff-active secondary amines or alcohols, evolution of carbon dioxide on the addition of water) and at the same time behave like acids (pH 0–2 in water, ability to be neuturalized with bases). Important for their practical application and characteristic of these substances is the ease with which they can be emulsified in alkaline aqueous media without the use of emulsifying agents, e.g. in 1 to 10 percent by weight sodium hydroxide solution or sodium silicate solution. Even products which have a very low degree of sulphonation, e.g. those prepared with 0.1 to 2 and in particular 1 to 2 percent by weight, are found to emulsify much more readily than the unsulphonated product when shaken with a 1% sodium hydroxide solution.

Sulphonation may be carried out as described in application Ser. No. 363,436 filed May 24, 1973 now abandoned, the disclosure of which is incorporated herein by reference thereto, and the subsequent neutralization, which is optional, also may be carried out as in that application.

The sulphonation reaction can generally be carried out without the aid of solvents. Up to about 10 percent by weight of sulphur trioxide, based on the liquid starting material, may be added at room temperature. To achieve higher degrees of sulphonation, it is suitable to use higher temperatures, e.g. 50° to 200° C., preferably 50° to 150° C. If a high degree of sulphonation is desired and more than 20 percent by weight of sulphur trioxide are used, it is advisable to use inert solvents such as 1,2-dichloroethane, 1,1,2,2-tetrachloroethane, trichlorofluoromethane, chlorobenzene or 1,2-dichlorobenzene or the like.

The sulphonation is preferably carried out by gasifying the reaction mixture with sulphur trioxide at 20° to 120° C. This may be carried out, for example, by passing a stream of nitrogen through a 65 percent oleum and then conducting the gaseous mixture into or over the reaction mixture. The reaction with sulphur trioxide is practically instantaneous. When oleum and sulphuric acid are used, it is generally not possible to avoid the formation of small quantities of insoluble ureas and, in addition, more highly viscous products are formed due to urea chain-lengthening. Sulphonation with oleum or sulphuric acid is, therefore, generally carried out only with quantities of up to about 10% of oleum and about 5% of sulphuric acid, based on the unsulphonated starting material.

Sulphonation with chlorosulphonic acid is accompanied by the formation of carbamic acid chloride. In the case of low degrees of sulphonation, it is advisable to decompose this carbamic acid chloride by heat and blow out the hydrogen chloride or to prevent the formation of carbamic acid chloride by carrying out sulphonation at an elevated temperature and in a stream of nitrogen.

Sulphonation with chlorosulphonic acid is generally only carried out in quantities of up to about 10%.

The neutralization of the isocyanate sulphonic acids originally formed is often accompanied by an increase in viscosity. When neutralization is carried out with tertiary amines, it is frequently observed that the viscosity initially falls. Furthermore, the hydrophilic character and reactivity of the products increase considerably. In some cases, this results in a reduction in the storage stability.

Neutralization, if necessary, can be carried out only shortly before the product is to be used. Furthermore, it has been found advantageous to carry out only a partial neutralization, e.g. of 5 to 40% based on the theoretical SO$_3$H group content (calculated from the sulphur content). When neutralization is carried out with tertiary amines or strong alkalis, a degree of neutralization of 5 to 20% is preferred. It is only when neutral salts of weak bases which have the character of fillers, such as magnesium carbonate, calcium carbonate, barium carbonate, zinc carbonate, calcium acetate, calcium oxalate, magnesium oxide, zinc oxide, iron hydroxide or cement are used as neutralizing agents that they may be added in excess without risk of damage.

When inorganic neutralizing agents are used, it should be noted that the water liberated in the neutralization reaction reacts with the isocyanate groups, in particular with the formation of urea. If it is desired to avoid the reduction in isocyanate content which this entails, it is advisable to use tertiary amines as neutralizing agents, e.g. triethylamine or pyridine.

The sulphur content of the products according to the invention is always lower than that calculated from the quantity of sulphur trioxide used because, in the presence of diphenylmethane derivatives, part of the sulphur is lost by the evolution of sulphur dioxide. The sulphonic acid group content can be calculated approximately from the sulphur content of the products provided by the invention. Particularly when using larger quantities of sulphonating agents, e.g. more than 5%, however, it should be assumed that the actual sulphonic acid group content is lower, a fact which may in some cases be attributed to unknown side reactions between the aforesaid sulphonating agents and the isocyanate groups. This interpretation is in agreement with the observation that, during the process of the invention the isocyanate content in the products of the process remains unchanged at low degrees of sulphonation of up to about 2% but drops at higher degrees of sulphonation.

The sulphonic acid group content in the products according to the invention can be determined by potentiometric titration and the isocyanate group content by conventional methods of isocyanate determination with dibutylamine, but the consumption of amino groups by the sulphonic acid must, of course, be taken into account.

The viscosity of the products of the process depends primarily on the visocsity of the liquid polyisocyanate mixture used as starting material, on the degree of sulphonation and on the degree of neutralization.

When isocyanate mixtures with an exceptionally low viscosity are used (viscosity about 10 to 40 cP at 25° C.), the process according to the invention makes it possible for low viscosity sulphonated polyisocyanates with a viscosity of 10 to 99 cP at 25° C. to be obtained which contain 20 to 42 percent by weight of isocyanate groups and 0.1 to 6 percent by weight of sulphonic acid groups. These low-viscosity products of the process are particularly interesting.

With higher degrees of sulphonation the viscosity of the products rises steeply even when low-viscosity polyisocyanate mixtures are used. Thus, the products obtained with a high degree of sulphonation corresponding to the use of 15 percent by weight of sulphur trioxide are highly viscous, substantially independently of the viscosity of the starting mixture. With a degree of sulphonation corresponding to the use of about 40 percent by weight of sulphur trioxide, based on the starting material which is to be sulphonated, the products obtained are resinous products which solidify at room temperature. It is noteworthy, however, that in no cases are crystalline products obtained so that even the aforesaid resinous products which solidify at room temperature are more closely related, in a crystallographic sense, to the liquid products of the process than to true solid substances. For this reason, the term "liquid polyisocyanates which contain sulphonic acid groups" used in this invention also includes such resinous products as well as those which are liquid at room temperature of say about 20° C.

Isocyanatosulphonic acids of the kind obtained as products of the process according to the invention and their salts were previously unknown. They are of the greatest interest, especially the low-visocisty products of the process, for the production of foams with hydrophilic centers. The low-viscosity products of the process as well as the more highly viscous products are particularly suitable for use as reactants for water glass for the production of organic-inorganic synthetic resins according to U.S. Application Ser. No. 364,763 filed May 29, 1973. The higly viscous, highly sulphonated products of the process are practically completely non-toxic compounds which again give rise to non-toxic substances when the polymers produced from them undergo degradation.

Resinous-solid isocyanatosulphonic acids and their salts are usually readily pulverized and suitable for use, for example, as physiologically harmless crosslinking agents in urethane and/or urea reactions.

EXAMPLE 1

5000 g of a commercial diisocyanato-diphenylmethane isomer mixture which had a viscosity of 22.6 cP at 25° C. and an isocyanate content of 30% was gasified with a stream of sulphur trioxide/nitrogen at room temperature until the sulphur determination indicated a sulphur content of 1.24%. The quantity of sulphur trioxide used was 170 g (3.4%).

The liquid product was separated from minor quantities of solid residue and proved to be stable in storage over several weeks. Viscosity: 108 cP/25° C.

The starting material used for sulphonation had been obtained by phosgenating a mixture of diaminodiphenylmethane isomers which had the following composition: 13.6% 2,2'-; 57.0% 2.4'-; 22.6% 4,4'-isomer.

EXAMPLE 2

5000 g of a commercial mixture of diisocyanato-diphenylmethane isomers which had a viscosity of 18.5 cP at 25° C. and an isocyanate content of 31% was gasified with a stream of sulphur trioxide/nitrogen at room temperature until sulphur determination indicated a sulphur content of 3.05%.

The quantity of sulphur trioxide used was 436 g (8.7%).

The liquid product was separated from minor quantities of solid residue and proved to be stable in storage over several weeks. Viscosity: 816 cP/25° C.

The starting material used for sulphonation had been obtained by phosgenating a mixture of diaminodiphenylmethane isomers which had the following composition: 7.0% 2,2'-; 53.6% 2,4'-; 35.0% 4,4'-isomer.

EXAMPLE 3

5000 g of a commercial mixture of diisocyanato-diphenylmethane isomers which had a viscosity of 18.5 cP at 25° C. and an isocyanate content of 31% (see Example 2 for isomer content) was gasified with sulphur trioxide at room temperature for 20 hours, the temperature rising to 32° C. The total quantity of sulphur trioxide taken up was 722 g (corresponding to 14.5%). The viscosity rises gradually. A liquid which is highly viscous at room temperature is finally obtained.

Viscosity: 50,000 cP/25° C. (sulphur content 5.25% corresponding to 13.3% of —SO$_3$H).

The product was diluted with 1600 g of 1,2-dichloroethane and filtered through a fine sieve. The residue was about 4 g and the isocyanate content was 18.6%.

EXAMPLE 4

1000 g of the reaction product obtained in Example 3 were diluted with 554 g of 1,2-dichloroethane and sulphonation was continued by gasifying the reaction product at room temperature with 71 g of sulphur trioxide (corresponding to a total of 21.6% of sulphur trioxide based on the unsulphonated starting material). A highly viscous, approximately 50% solution of the sulphonated isocyanate is obtained, which becomes solid when left to stand for some time. The product is soluble in dimethylformamide. Sulphur content based on the solids content was 8%, corresponding to 20% of SO₃H.

EXAMPLE 5

A mixture of 500 g of the starting material used for sulphonation in Example 2, which had been stored at room temperature for 1 year and had a viscosity of 23 cP and 100 g of tolylene diisocyanate (isomeric ratio 65% 2,4- and 35% 2,6-) had a viscosity of 16 cP. Sulphur trioxide in a stream of nitrogen was passed over the stirred mixture at the given temperatures. After absorption of the given quantity of sulphur trioxide, the sulphur content of the product and the viscosity were determined.

| Quantity of sulphur trioxide taken | | | | | |
|---|---|---|---|---|---|
| up (g) | | 13 | 27.5 | 51.3 | 90 |
| (%) | 0 | 2.2% | 4.6% | 8.6% | 15% |
| Time (hours) | 0 | 3 | 7.5 | 11 | |
| Temperature (° C.) | 22 | 27 | 31 | 38 | 40 |
| Sulphur content | 0 | 0.8 | 1.6 | 2.9 | 5.3 |
| Viscosity (cP/25°C.) | 16 | 27 | 66 | 800 | >50,000 |

The sulphonation product, which has a sulphur content of 2.9%, readily emulsifies in water.

EXAMPLE 6

An experimental series was carried out in a similar manner to Example 5 but 200 g of the tolylene diisocyanate mixture were added instead of 100 g.

| Quantity of sulphur trioxide taken | | | | | |
|---|---|---|---|---|---|
| up (g) | | 34.5 | 61.6 | 95 | 134.5 |
| (%) | 0 | 4.9% | 8.8% | 13.5% | 19.3% |
| Temperature (°C.) | 28 | 33 | 34 | 30 | 108 |
| Sulphur content (%) | 0 | 1.7 | 2.9 | 4.7 | 6.5 |
| Viscosity, (cP/25°C.) | 13 | 60 | 460 | 14,000 | solid |

The product, which contained 6.5% of sulphur (corresponding to a theoretical sulphonic acid group content of 16%), can be poured as a liquid at 110° C. and solidifies at room temperature. At 0° C., it can be pulverized in a mortar. A powder which is free-flowing at room temperature is obtained.

EXAMPLE 7

A mixture of 500 g of commercial diisocyanato-diphenylmethane containing a high proportion of the 2,4'-isomer (composition as in Example 2) and 500 g of tolylene diisocyanate (65% 2,4-; 35% 2,6-isomer) was prepared in a similar manner to Example 5. The viscosity of the mixture was 10 cP.

34.5 g of sulphur trioxide (3.45%) were introduced at 23° C. over a period of 3 hours, the temperature rising to 31° C. After stirring had been continued for a further 2 hours, a sulphonation product with a sulphur content of 1.45% and a viscosity of 16 cP was obtained.

A further 28 g of sulphur trioxide were then introduced in 2 hours. A thinly liquid product was obtained which has a sulphur content of 2.1% and a viscosity of 60 cP/25° C.

During the whole experiment, no crystalline constituents separated within the liquid phase whereas in the gaseous phase, which contained tolylene diisocyanate, a solid crystalline, insoluble deposit formed on the wall of the flask.

Comparison Experiment

If pure tolylene diisocyanate (isomeric mixture 65% 2,4-; 35% 2,6-) with a viscosity of 3.5 cP/25° C. is sulphonated in a similar manner, an insoluble crystalline product identical with the deposit formed on the wall of the flask in the previous experiment separates within a short time when sulphur trioxide is introduced. According to analysis and the IR spectrum, this crystalline product is a mixture of monosulphonic acid and disulphonic acid of the dimer (uretdione) of tolylene-2,4-diisocyanate.

EXAMPLE 8

The isocyanate mixture used as starting material in Example 6 is sulphonated by slowly introducing 40 g of 65% oleum (corresponding to 37.4 g of sulphur trioxide = 5.3%) dropwise at 22° C. with stirring. 17 g of crystalline product (2.3% of the total quantity) separate. The liquid main product contains 1.2% of sulphur.

EXAMPLE 9

The following experimental series demonstrates the influence of the 2,4'- and 2,2'-diisocyanato-diphenylmethane content on the sulphonation product.

The isocyanate mixture used in Example 2 (component A) which contains ortho-isocyanates was mixed with increasing quantities of 4,4'-diaminodiphenylmethane (component B) so that the mixture contained the given quantities of "ortho-constituent" (2,4'-diisocyanato-diphenylmethane + 2,2'-diisocyanato-diphenylmethane). About 2 g of gaseous sulphur trioxide were then introduced into 40 g portions of the mixture over a period of 15 minutes. The products were tested for the presence of crystallized sediment. It was found that sedimentation does not occur when the ortho content is greater than 20%.

| A : B | "ortho-constituent" | Temperature during sulphonation | Sediment |
|---|---|---|---|
| 1:1 | 30% | 20-40° | — |
| 1:1.5 | 25% | 20-50° | — |
| 1:2 | 20% | 20-45° | very little |
| 1:3 | 15% | 20-40° | copious |
| 1:4 | 10% | 20-40° | copious |

EXAMPLE 10

3.0 g (0.03 mol = approximately 50% of the calculated SO₃H-group content) of triethylamine were added to 100 g of the product obtained in Example 7. The viscosity was 57 cP at 25° C. When the product was mixed with water, a milky emulsion was obtained which had a pH of 2 and vigorously evolved carbon dioxide.

The un-neutralized product from Example 7 also reacts with water to form a slightly coarser emulsion which has a pH of 1 and evolves carbon dioxide somewhat more slowly.

EXAMPLE 11

100 g of the product obtained in Example 1 are stirred up with 2.8 g of calcium oxide. After 24 hours, the viscosity is 65 cP. The emulsion formed with water has a pH of 2.

EXAMPLE 12

100 g of the product obtained in Example 7 is stirred up with 10 g of calcium carbonate for several hours. After 25 hours, the viscosity is approximately 120 cP. The pH of the aqueous emulsion is 3.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Non-crystalline aromatic polyisocyanates, which contain sulphonic acid or sulphonate groups, prepared by a process comprising reacting at a temperature from −20° C. to 200° C.:
   (A) liquid multicomponent aromatic isocyanate mixtures having an NCO content of from 10 to 42% by weight, and having a viscosity of from 8 to 49 cP at 25° C., said liquid multicomponent aromatic isocyanate mixture containing:
      (i) at least 40% by weight of phosgenation products of aniline-formaldehyde condensates, and
      (ii) at least 20% by weight of 2,6-tolylene diisocyanate, 2,4'-diisocyanato-diphenylmethane, 2,2'-diisocyanato-diphenylmethane or mixtures thereof, said percents by weight being based on the total weight of said liquid multicomponent aromatic isocyanat mixtures, and
   (B) from 0.1 to 40% by weight, based on the weight of said liquid multicomponent isocyanate mixture, of sulphur trioxide, or an equivalent quantity of oleum, sulphuric acid, or chlorosulphonic acid.

2. The non-crystalline aromatic polyisocyanate of claim 1, having an isocyanate content of 20 to 42% by weight, a sulphonic acid and/or sulphonate group content of 0.1 to 6% by weight and a viscosity at 25° C. of 10 to 99 cP.

3. The non-crystalline aromatic polyisocyanate of claim 2, wherein said non-crystalling aromatic polyisocyanate is liquid at about 20° C.

* * * * *